US010684205B2

(12) United States Patent
Martins (10) Patent No.: US 10,684,205 B2
(45) Date of Patent: Jun. 16, 2020

(54) METHOD AND APPARATUS TO IMPROVE ANALYTICAL METHOD DEVELOPMENT AND SAMPLE PREPARATION FOR REPRODUCIBLE PARTICLE SIZE MEASUREMENT

(71) Applicant: Hovione Technology Ltd, County Cork (IE)

(72) Inventor: Leandro Martins, Lisbon (PT)

(73) Assignee: Hovione Technology Ltd, County Cork (IE)

( * ) Notice: Subject to any disclaimer, the term of this patent is extended or adjusted under 35 U.S.C. 154(b) by 0 days.

(21) Appl. No.: 16/321,840

(22) PCT Filed: Jul. 31, 2017

(86) PCT No.: PCT/EP2017/069346
§ 371 (c)(1),
(2) Date: Jan. 30, 2019

(87) PCT Pub. No.: WO2018/024687
PCT Pub. Date: Feb. 8, 2018

(65) Prior Publication Data
US 2019/0178772 A1    Jun. 13, 2019

(30) Foreign Application Priority Data
Aug. 2, 2016   (PT) .......................... 109563

(51) Int. Cl.
*G01N 15/02* (2006.01)
*G01N 1/28* (2006.01)
(Continued)

(52) U.S. Cl.
CPC ....... *G01N 15/0205* (2013.01); *B06B 1/0261* (2013.01); *G01N 1/286* (2013.01);
(Continued)

(58) Field of Classification Search
CPC .......... G01N 15/0205; G01N 15/1434; G01N 15/1404; G01N 2015/1493; G01N 2015/0092; G01N 2035/00554
(Continued)

(56) References Cited

U.S. PATENT DOCUMENTS 5,064,765 A * 11/1991 Karasikov ............ G01N 33/493
356/318
8,107,074 B2 * 1/2012 Moriya ............... G01N 15/0211
356/335
(Continued)

FOREIGN PATENT DOCUMENTS

| EP | 1879688 B1 | 1/2008 |
|---|---|---|
| WO | 02079751 A2 | 10/2002 |
| WO | 2008016691 A2 | 2/2008 |

OTHER PUBLICATIONS

"Particle Size analysis by laser diffraction: ISO 1332, Standard Operating Procedures, and Mie theory" by Rod Jones, published in American Laboratory, Jan. 2003, pp. 44-47.
(Continued)

*Primary Examiner* — Hoa Q Pham
(74) *Attorney, Agent, or Firm* — 24IP Law Group USA, PLLC; Timothy Dewitt (57) ABSTRACT

A method and an apparatus to improve the precision and reproducibility of particle size analysis by laser diffraction is presented. Powder particles are typically prepared for laser diffraction testing using an ultra-sound bath which will disperse particle agglomerates and allow a precise measurement. However, the precision and reproducibility of agglomerate dispersion is affected by ultra-sound probe wear, corrosion and age. Differences in sonication performance can be compensated by voltage adjustments to the ultra-
(Continued)

sound probe, leading to substantial improvements in the precision and reproducibility of particle size determination.

7 Claims, 4 Drawing Sheets

(51) Int. Cl.
    *B06B 1/02*     (2006.01)
    *G01N 29/00*     (2006.01)
    *G01N 15/14*     (2006.01)
    *G01N 15/00*     (2006.01)
    *G01N 1/40*     (2006.01)

(52) U.S. Cl.
    CPC ......... *G01N 15/1404* (2013.01); *G01N 29/00* (2013.01); *G01N 2001/4094* (2013.01); *G01N 2015/0053* (2013.01); *G01N 2015/0092* (2013.01); *G01N 2015/142* (2013.01); *G01N 2015/1493* (2013.01)

(58) Field of Classification Search
    USPC .......................................... 356/335–343, 73
    See application file for complete search history.

(56) References Cited

U.S. PATENT DOCUMENTS

| | | | |
|---|---|---|---|
| 10,362,803 B2* | 7/2019 | Bellinger | H05B 1/0227 |
| 2004/0227414 A1 | 11/2004 | Gunnerman et al. | |
| 2010/0177311 A1* | 7/2010 | Wada | G01N 15/0211 |
| | | | 356/336 |
| 2010/0191120 A1 | 7/2010 | Kraus et al. | |
| 2013/0087445 A1 | 4/2013 | Luotola et al. | |
| 2014/0158550 A1 | 6/2014 | Kushal et al. | |
| 2014/0375992 A1* | 12/2014 | Sugasawa | G01N 15/0211 |
| | | | 356/336 |
| 2016/0002708 A1 | 1/2016 | Laugharn et al. | |
| 2016/0178500 A1* | 6/2016 | Totoki | G01N 15/0205 |
| | | | 356/338 |

OTHER PUBLICATIONS

O'Donnell and McGinity, "Properties of multiphase microspheres of poly(dl-lactic acid) or poly (dl-lactic-co-glycolic acid) produced by mechanical agitation, sonication, or potentiometric dispersion," Journal of Microencapsulation, Taylor and Francis, Basinstroke, GB vol. 13 No. 6: Nov. 1, 1996, pp. 667-677, XP000632685, ISSN: 0265-2048.

Amy Sabian—The Particle Experts, Problems in particle size: Laser Diffraction Observations—Autumn 2011, vol. 15 / No. 04)

Van der Graaf—Sonocrystallization, Nucleation of ammonium sulfate and alfa-lactose monohydrate due to ultrasonic irradiation—Master of Science thesis, Delft University of Technology, Jan. 2011).

Lawrence C. Lynnworth—Industrial Application of Ultrasound—A Review. II. Measurements, Tests, and Process Control Using Low Intensity Ultra-sound—IEEE Transactions on Sonics and Ultrasonics, vol. SU-22, No. 2, Mar. 1975.

Patrick Dunne—Nonthemial Processing Technology for food—ISBN: 978-0-8138-1668-5, Oct. 2010).

F. Storti and F. Balsamo—Particle size distributions by laser diffraction: sensitivity of granular matter strength to analytical operating procedures. Published in Solid Earth Discussions, Apr. 19, 2010).

* cited by examiner

METHOD AND APPARATUS TO IMPROVE ANALYTICAL METHOD DEVELOPMENT AND SAMPLE PREPARATION FOR REPRODUCIBLE PARTICLE SIZE MEASUREMENT

CROSS REFERENCE TO RELATED APPLICATIONS

This application claims benefit of and priority to Portuguese provisional application No 109563 filed on 2 Aug. 2016.

FIELD OF THE INVENTION

The present invention relates to a method and an apparatus to improve sample preparation for particle size measurement by laser diffraction, and more particularly to calibration of ultrasonic probes used in ultrasonic sample preparation of highly cohesive powders for particle size measurement.

BACKGROUND OF THE INVENTION

Laser diffraction is a well-known technique for measuring sizes of particles in a dry powder state or suspended in a liquid suspension. A laser light is directed through the powder or suspension containing the particles to be measured. The particles cause the light to be diffracted, with the degree or angle of diffraction being dependent on the size of the particles in the suspension. By measuring the diffraction of the laser, it is thereby possible to calculate the size of the particles in the sample. The technique is described, for example, in the article "Particle Size analysis by laser diffraction: ISO 1332, Standard Operating Procedures, and Mie theory" by Rod Jones, published in American Laboratory, January 2003, pages 44-47.

Accurately measuring particle size, median particle size and particle size distribution is important, particularly in the pharmaceutical industry, where particle size is a critical quality attribute in determining how active drugs can be formulated, how stable the active drugs are and how bioavailable the active drugs are. In certain applications, there is a requirement for the drug particles to be engineered to a median particle size target varying by no more than ±0.2 micron and even ±0.1 micron. This is an exquisite level of precision. In the pharmaceutical industry, precise and reproducible particle size measurements are necessary for manufacturing process development and validation, quality control purposes and generic product development.

There is therefore a need to be able to manufacture these particles to a very high level of precision, but this is only warranted if the analytical method is sufficiently precise to measure the particle size to the appropriate level of precision.

Unfortunately, unexplained variations in the precision of measurements have been observed since the method of laser diffraction for particle size analysis came into widespread use. These unexplained variations in the precision of the measurements are an obstacle to obtaining the benefits mentioned above and, more importantly, the variations prevent analytical laboratories from independently verifying and matching results obtained in another facility. Several theories have been advanced for these variations, such as algorithm artefacts in the interpretation of the diffraction of the laser beams, the chaotic nature of the flight of particles, the presence of bubble peaks, thermal artefacts, dry dispersion artefacts, optical model artefacts or the angle of incidence of the laser beam on the surface of the particles. Such problems are abundantly described in the literature (1, 2, 3, 4, 5) and solutions have been advanced. None of the solutions however have solved the precision issue of particle size measurement.

The research supporting the present application is oriented towards improving the de-agglomeration of tested particles.

It is known that the particles have a propensity to agglomerate or stick together. This is particularly true in the case of those particles which have been subjected to a size-reduction process, such as milling, jet mill micronization or wet polishing. The particles subjected to this size-reduction process demonstrate a very high level of cohesion, that is the particles stick together and form agglomerates of the particles. For this reason, it is preferred to suspend the particles in an appropriate suspension medium, which will promote the de-agglomeration of the particle clusters. In the absence of this suspension step, the particle size measurement performed by the laser diffraction equipment may result in inaccurate large measurement readings because the laser diffraction method cannot distinguish between large individual particles and smaller particles which have stuck together to form the larger agglomerate of the same size.

To de-agglomerate the suspended particles and to increase the precision of the particle size measurement, it is known to place the suspension in an ultrasonic bath, prior to the particle size measurement taking place. The ultra-sound bath contains an ultra-sound probe which excites the particles in the suspension and causes the particles to de-agglomerate from each other and hence causes the particles to separate from each other. This process is disclosed, for example, in European Patent No. EP 1 879 688 B1 (Orion), or International Patent Application No. WO 2008/016691 A2 (Covaris, Inc.).

During this de-agglomeration process, it is important that the ultra-sound probe is set to the correct voltage setting. If the voltage setting is set too low, then either the particles will not completely separate from each other or the process will take too long. If the voltage setting is set too high, the agitation of the particles can cause the individual particles to break down to a size smaller than that resulting from the manufacturing process. It has been found that in all these cases, this imperfect de-agglomeration will lead to an incorrect size measurement of the particles.

In the current art, the powders of interest intended for the particle size measurement need to undergo a sample preparation step to ensure that the measurement is likely to be more precise when the particles are suspended in a liquid medium, as opposed to the dry state. In a liquid suspension, the particle agglomerates need to be thoroughly dispersed, so that the laser beam will be diffracted by discrete particles and not by agglomerates of the particles. It will be appreciated that diffraction of the laser beam from the agglomerates of the particles will obviously result in incorrect size measurements.

For this purpose, samples of the powders of interest are usually placed in an appropriate anti-solvent in which the powders of interest may become suspended and a dispersant may be added to promote the de-agglomeration of the powders of interest. The suspension is placed in an ultra-sound bath comprising an ultra-sound probe connected to a power supply and a voltage controller, and the sample is sonicated for a set period, resulting in agglomerate dispersion of the powders.

In the laser diffraction apparatus that are commercially available, such as models manufactured by Malvern Instruments (Malvern, UK), the ultra-sound bath is provided within the apparatus itself, but the sample could equally be prepared in an ultra-sound bath independent of but conveniently adjacent to the apparatus. In such equipment, the voltage that is applied to the ultra-sound probe is given by an analogue representation of a power scale ranging from 0% to 100% of maximum power, in the software application of the equipment manufacturer. An analyst slides the power command control on the computer screen to vary the voltage of the ultra-sound probe. In equipment where the ultra-sound bath is not part of the laser diffraction equipment, the power can be set in many different ways. In certain models, ultra-sound baths function at a constant voltage and the variable to effect different sonication levels is simply the duration of the sonication. In other equipment, the power may be varied using a percent control of maximum power, or by setting a power level in watts or volts. In other words, the methods of setting ultra-sound power for the ultra-sound probe vary according to the equipment used.

Once the sample has been sonicated according to a validated method, the sample is introduced into the laser diffraction equipment and the measurement is made, yielding information about particle size, particle size distribution, surface area, etc.

To accurately measure the particle size of a powder of interest, two distinct steps are necessary. First, the analytical method must be developed and validated and each analytical method is specific to the product itself. This method development is important as the analytical method allows, in theory, the measurement to be repeated by different analysts using different laser diffraction equipment in different laboratories and to yield a valid result—in principle, the same test data should be obtained for the same batch of product.

In method development in the current art, the sonication step and its correct method development are important. To obtain the correct setting to analyze the particle size of a given compound, it is necessary to undergo a calibration procedure to obtain a correct power setting for the ultrasound probe and to determine the correct sonication time for the suspension. It should be noted that this calibration will vary from product to product, as the products differ in terms of cohesiveness and in the way in which the products respond to sonication. The power for the head in the ultra-sound probe is set by a power controller command which is scaled from 0% to 100%—100% being maximum power. The power controller command is therefore set up so that the user selects the power level based on a percentage of the maximum rated power for the ultra-sound probe. For the method development and validation procedure, a power setting is selected on the power controller command and a sample suspension containing particles of a known size is exposed to the sonication or ultra-sound agitation. Size measurements by laser diffraction are taken and recorded at regular intervals until either complete de-agglomeration of the particles is confirmed, maximum time is reached or breakdown of the particles themselves is detected (measured particle size is less than the particle size of the sample, if the particle size is known).

The process is then completed at different power settings of the ultra-sound probe, and the results are analyzed by laser diffraction in order to determine the optimum power setting and exposure time for the particle type of the sample. The power setting is recorded as the percentage setting which should be set on the power controller command. This power setting is then recorded as part of the method development procedure and repeated using different batches of the same product, to obtain robust data upon which the applicable settings to use in the future when dealing with samples of the same product in the future, will be based. This is known as method development and validation and due to the time required to complete the procedure, it is normally only carried out when the new product is tested for the first time. Such validated settings are then usable, across the same type of ultra-sound baths and the laser diffraction particle size measurement machines.

After method development and validation of the prior art have been carried out, the second step of operation is routine analysis, in which the analyst consults the method development data for the product of interest, sets the ultra-sound probe and the ultra-sound head to the required power for sonication during the prescribed time, and then determines the particle size using the laser diffraction machine.

In theory, the determination of the particle size by laser diffraction, given a homogenous powder, should always yield the same result. In practice, it does not, with significant variations being observed when the same batch of powder is tested in different laser diffraction equipment. Indeed, it has been found that, on occasion, there is a significant deviation in the results obtained from different machines of the same model using the same settings on samples of the same batch of product. Tests carried out using two different machines do not always produce matching results, particularly when the need for precision is very high—as in the case of very small particle sizes such as are required for inhalation products. If the target median particle size is of 50 microns, then a variance of ±3 microns is not significant, but if the target particle size is 4 microns, then the same variance is extremely significant. Similarly, it has been found that the same machine can produce different results when testing different samples of the same batch of product at different times.

The problem is compounded by the fact that it occurs intermittently. On occasion, two different laser diffraction particle size analyzers have been found to produce different particle size test data for a same batch of powder. However, in other instances, notably at later test times—say months later—the same two analyzers may again agree and the test data are substantially the same from both analyzers.

It will be appreciated how the intermittent nature of this variability in the test data has had an important impact on analytical operations in the pharmaceutical industry. Laser diffraction is regarded as precise analytical method, and this is confirmed by widespread acceptance of the technology, not just for research and development purposes, but importantly for quality control. In this function, when a manufacturer supplies a product manufactured to a given particle specification and a customer needs to verify that the product does indeed meet its quality specification, disagreements over the test data have led to customers to reject batches of the product which apparently were failing to meet the required particle characteristics, at great cost to the manufacturer.

This issue has been known for more than 20 years, but previously no solution had been found. Sometimes users resorted to buying new ultra-sound probes, at great expense, but there was no scientific rationale for doing so. In other cases, analyst error was blamed after costly investigations. In extreme cases, particle analysis by laser diffraction would be replaced in the product specification by a less precise, but more reproducible method.

The present invention resides in the identification that the cause of this problem of non-reproducibility of results is due to differences and variability in the ultra-sound sonication arising from worn and/or damaged zones of the heads in the ultra-sound probes. It has been discovered that as the ultra-sound probes are used, the vibrating surfaces thereof become eroded and worn. The eroded and worn ultra-sound probes develop less energy and are therefore able to sonicate less, whereas defective or damaged ultra-sound probes may sonicate too much and break the particles. As a result, when the power for the ultra-sound probe is set on the power controller command using the percentage setting obtained during the method development and calibration process, the actual power delivered by the ultra-sound head has now been found, on occasion, to be different for different ones of the ultra-sound probes. In other words, the power that is set using the power controller command according to the method development and validation process does not always result in the same voltage being produced by the ultra-sound head. The inventors have found that this difference in delivered power for sonication explains the differences in particle size determinations that have been historically observed.

The need to control the voltage in an ultra-sound probe is known and there are several references in the prior art to this and to the control mechanisms employed in voltage adjustment. For instance, US patent application US20100191120A1 claims an ultra-sound system, wherein a sensor processor configured to generate a selection signal associated with an action when a detected level of at least one parameter associated with an object, is within a predetermined range of parameters including voltage. The ultra-sound system is controlled based on capacitance changes detected on the surface of the ultra-sound probe. However, the invention is directed at making user operation easier by reducing the number of manual commands and not at informing the user of the change in certain operating parameters, including voltage, to compensate for the loss of probe efficiency. Importantly, this prior art application does not contain any teaching that would enable the expert to identify voltage variations in sonication due to variable levels of ultra-sound probe corrosion as the root cause of imperfect dispersion of particle agglomerates and consequently poor reproducbility in particle size analysis by laser diffraction. Additionally, validation requirements in use the pharmaceutical industry would not have permitted automatically setting a sonication power level different from the power level determined in the method development and validation phase.

The difficulty in identifying the root cause of the variability lies in the fact that changes in the voltage produced by the aging probes occur over very long periods of time, so that unexplained differences in the particle size analysis test data have, to date, not been attributed to sonication and dispersion issues, and much less so to variability in voltage output from the ultra-sound probes.

SUMMARY OF THE INVENTION

According to the present invention, there is provided a method to apply electrical energy to an ultra-sound probe in an ultra-sound bath, comprising measuring the actual voltage produced by the ultra-sound head in the ultra-sound probe. This voltage is measured by a voltmeter connected to the ultra-sound probe which the analyst reads and then uses to adjust the percent power controller until the displayed voltage substantially matches the desired voltage.

In a first application of this method, a correct and reproducible particle analysis method development and validation by sonication and laser diffraction may be performed to prepare and analyze a powder of interest.

This method to develop and validate an analytical procedure includes taking a product of interest, such as but not limited to a pharmaceutical product, and sonicating the product of interest at a given power reading on the power controller command while looking at the voltmeter connected to the ultra-sound probe and recording both the power setting and the corresponding voltage. While the product is being sonicated at this first power level, parts of the sample are measured by laser diffraction to obtain information on the suitability of the power setting chosen for de-agglomeration, as well as identifying the most suitable duration of sonication, at that power level. The sample is then subjected to a second, different power level using the power controller command, and the actual voltage produced by the ultra-sound probe is displayed on the voltmeter. The analyst again adjusts the power controller command and records the corresponding voltage on the voltmeter. Again, the sonicated samples are taken at various timed intervals and their particle size is measured by laser diffraction and the process is repeated until the particle size measurements stabilize. At this point, the method development and validation step is concluded and the analyst records the final percent power setting and corresponding voltage on the voltmeter ("the validated voltage") used for the sonication of the sample, as well as the duration of this operation.

These sonication, de-agglomeration and particle size measurements are operations which are carried out for all the power settings that are experimented and these settings are always set by checking the value displayed on the voltmeter connected to the ultra-sound probe.

In a second application of the present method, the analyst uses the data for percent power and validated voltage obtained in the method development and validation phase to perform subsequent routine particle size tests for the same product for which the method was developed. Whereas in the prior art the analyst relied only on the percent power scale which measured the amount of power delivered to the ultra-sound probe to set up the sonicator for use, in the present case the analyst adjusts the power controller command by looking at the voltmeter and comparing the displayed value with the validated voltage value. The analyst then adjusts the percent power scale until the voltage displayed on the voltmeter substantially matches the validated voltage, thus concluding the sonicator setup and adjustment process. The sample is now sonicated according to the parameters of the method development and validation and thereafter tested by laser diffraction.

As the heads in the ultra-sound probes age and become worn, it has been found that the percent power reading on the power controller command determined during method development and validation no longer corresponds to the initial validated voltage: for a given percent power, the voltage measured at the ultra-sound probe is observed to become lower, requiring an increase in the percent power scale to bring the voltage up to the level of the validated voltage. This adjustment in percent power compensates the reduction in voltage observed in the worn ultra-sound probe and allows the ultra-sound probe, independently of its age and wear, to be used always at the same validated voltage. This results in the sample of suspended powder to be sonicated with the same amount of power and to be dispersed with the same level of efficiency.

Conversely, it should be noted that if the method development and validation was performed with an old, worn ultra-sound probe, the analyst will have to reduce the power on the percent power scale so that the displayed voltage on a newer, higher-efficiency ultra-sound probe matches the original validated voltage.

It should additionally be noted that certain laser diffraction equipment include in their hardware components devices to measure power or voltage, so that the addition of a voltmeter is not needed as the onboard circuits will be able to measure the voltage actually produced by the ultra-sound probe.

An apparatus for preparing samples of product for particle size measurement is also described. The apparatus comprises a power supply, a power controller command, an electronic controller to calculate a voltage from percent power information given by the power controller command and then to convert the voltage from the power supply into the calculated voltage suitable for the ultra-sound probe in the ultra-sound bath containing the suspension of particles of interest, and a voltmeter connected to the ultra-sound probe which the analyst can consult to continuously vary the voltage until the validated voltage level is reached. A comparator can also be used to automatically vary the voltage until the validated voltage is reached. A probe controller can integrate the voltmeter, the power controller, and the comparator.

A method is described in which ultra-sound energy is used to disperse precisely and reproducibly agglomerates of particles of interest suspended in liquid medium.

There is also provided a method where the actual voltage driving an ultra-sound probe can be adjusted by a variable power controller command and this adjustment can compensate for differences in sonication performance caused by different levels of wear and corrosion on the ultra-sound probe.

There is also provided the use of a sample preparation apparatus to prepare a sample of particles of interest for size measurement by laser diffraction.

There is also provided a method where differences in sonication efficiency produced by different ultra-sound probes can be compensated and reduced by adjusting the variable power command control to a level achieving a constant, validated voltage readout on a voltmeter connected to the ultra-sound probe.

There is also provided a method of sonication of a particle suspension for use in laser diffraction particle analysis. This includes identifying the ultra-sound probe voltage setting and the required sonication time for de-agglomerating the particles of a specific product setting the probe power by measuring the actual voltage produced by the probe, adjusting the power setting of the probe until the measured voltage is the same as the validated voltage setting and sonicating the suspension for the identified time.

In use, the method of the present invention is distinct from the prior art in that the analyst, whether developing a new method for a new product of interest, or conducting routine analysis will rely not on the power controller command as the sole way of setting the voltage of ultra-sound probe, but on the information given by the voltmeter connected to the ultra-sound probe, as this reading from the voltmeter will give a reading which is independent of probe wear and corrosion. The analyst will then use the reading of the voltmeter to adjust the power controller command.

In method development using the present invention, the analyst prepares a suspension of a product of interest using known methods. An initial percent power value is set on the power controller command, with 100% being maximum power. As the sonication begins, the analyst records the actual voltage that corresponds to the power setting on the power controller command. A first size measurement by laser diffraction is then made and the analyst continues the sequence of sonication and particle size measurement, the results of which are recorded at regular intervals until either complete de-agglomeration is confirmed, maximum time is reached or breakdown of the particles themselves is detected (measured particle size is less than the particle size of the sample, if known). The process is then completed at different power settings of the ultra-sound probe, including checking and recording the corresponding voltage on the voltmeter, and the results are analyzed by laser diffraction. The voltage on the voltmeter is recorded at the conclusion of the process as the value which will be used in future sample preparation and tests. Preferably, the particle size measurements at timed intervals are collected at a plurality of different power settings of the probe, the actual voltage produced by the probe being measured and recorded for each power setting, the particle size measurement data being analyzed for all the different power settings, and a power level and time for the particle type for optimum de-agglomeration being selected based on the particle size measurement data collected for all the power settings.

In order to validate the process, different samples of the same product are then sonicated and tested, using the final values of the first run. Since the level of corrosion of an ultra-sound probe is unlikely to increase during the method development process (typically a day or a few days), the method validation always stands a good chance of success, whether using the method of the prior art or the method of the present invention. Therefore, proof of the benefits of the present invention can only be demonstrated by validating the method across different ultra-sound baths of the same model. It will be expected that in such instances, the ultra-sound probes in the different ultra-sound baths will be worn to differing amounts.

The present invention still further provides a method of sonication of a particle suspension for use in laser diffraction particle analysis, comprising identifying the ultra-sound probe voltage setting and sonication time for a particular particle type, setting the probe power by measuring the actual voltage produced by the ultra-sound probe and adjusting the power setting of the ultra-sound probe until the measured voltage is the same as the identified validated voltage setting, and sonicating the suspension for the identified time.

The methods of the invention have the advantage that, by measuring the actual voltage produced by the ultra-sound probe and using this value as the power setting, variations in performance due to ageing, wearing or damage to the ultra-sound probe is obviated as the power setting on the controller is set not to a fixed percentage level as in the prior art, but is varied to ensure that a fixed voltage is produced by the ultra-sound probe and hence that the same sonication performance is reproduced on different probes. Deviations in results are thereby significantly reduced, and, furthermore, life of the ultra-sound probes extended as reduction in power can easily be counteracted. In addition, there is an economy, as worn and corroded ultra-sound probes can be used for a longer period of time. In industrial settings, the present method provides for different laser diffraction analysis machines comprising ultra-sound baths equipped with ultra-sound probes of different ages or exhibiting variable levels of corrosion or wear and tear and installed in different laboratories to produce the same or substantially equivalent test results. This is a considerable improvement with significant economic impact. The method of the invention has been found to provide a three- to four-fold improvement to the reproducibility of particle size determination.

The actual voltage produced by the ultra-sound probe may be measured in a well-known manner by applying a voltmeter of any conventional type to the ultra-sound probe.

It should be noted that the described method is applicable to any laser diffraction apparatus analyzing suspended particles in which the measurement system can be impacted by imperfect sample preparation and improved by this new sample dispersion system used in ultra-sound sonication.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
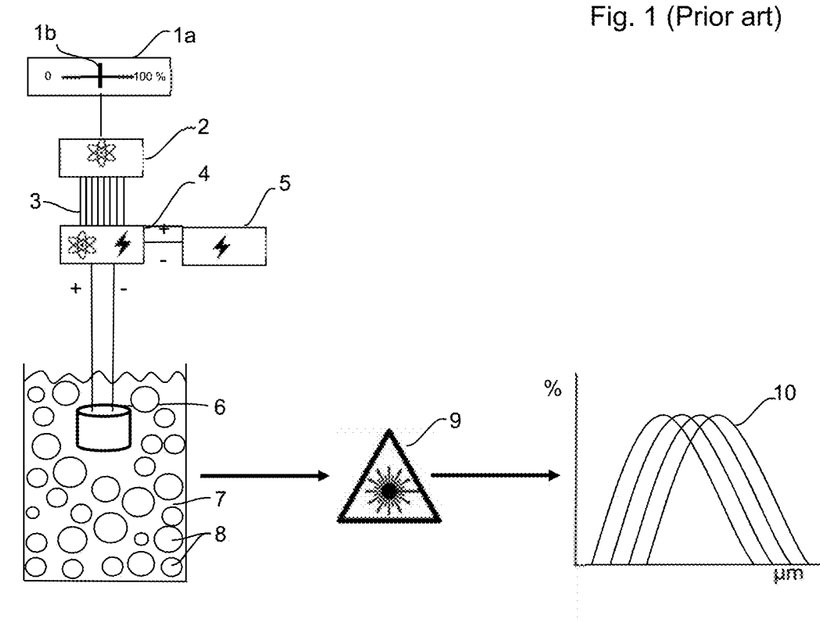
FIG. 1 shows the laser diffraction test equipment of the art.

FIG. 1 shows a representation of the laser diffraction test equipment according to the prior art. A power controller command 1a comprises a percent power scale 1b which is used to set a given power level to be transmitted to an electronic motherboard 2 which calculates a desired voltage level from a user input. This calculated voltage level is communicated to an electronic power controller 4 via data channels 3 (which contain additional information about alarms and filters). The functions of the electronic motherboard 2 and of the electronic power controller 4 are shown here as being located in different hardware components, but need not be. In other embodiments, the functions of the electronic motherboard 2 and of the electronic power controller 4 could be supported in single component.

The electronic power controller 4 is connected to a power supply 5 which the electronic power controller 4 uses to generate the calculated voltage which is then sent to an ultra-sound probe 6 of an ultra-sound bath 12 containing a suspension 7 of particles 8 for a product. The particles 8 are shown in FIG. 1 to be of variable sizes to represent imperfect sonication. The sonicated particles 8 are then channeled or taken to a laser diffraction equipment 9 for particle size measurements, which appear recorded as particle size distributions on histograms 10. Widely spaced histograms 10 represent the variability in size measurements taken of the same sample of product in different laser diffraction equipment and the poor precision and reproducibility of the prior art method and apparatus.

Figure 2:
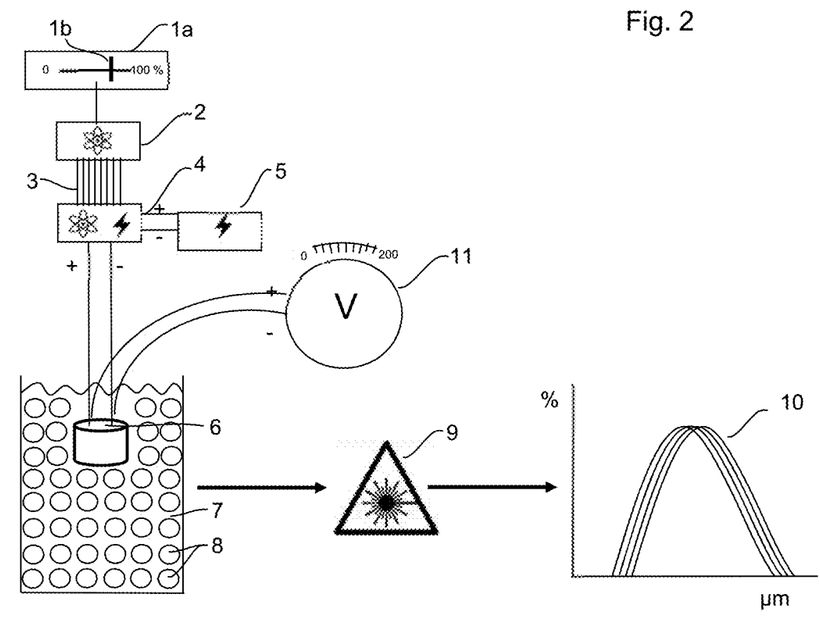
FIG. 2 shows the laser diffraction test equipment of the invention.

FIG. 2 shows a representation of the laser diffraction test equipment according to the present description. The same reference numerals are used in FIG. 2 and in FIG. 1 to illustrate the same or similar elements. In the power controller command 1a the percent power scale 1b has been set to give a higher power level than the one used in the prior art apparatus of FIG. 1, to compensate for the poor sonication and results variability seen there. The difference between the prior art apparatus shown in FIG. 2 and the apparatus of this document is the presence of the voltmeter 11 which is connected to ultra-sound probe 6.

In certain equipment, a voltage measurement function may be included in the existing hardware, obviating the need to install a voltmeter. Similarly, a probe controller comprising those elements needed to control the ultra-sound probe 6 can be constructed. The probe controller could include the voltmeter 11, the power controller 4 as well as a comparator for comparing the actual (measured) voltage with the validate voltage and adjust the power controller 4, as will be explained below. The probe controller could be integrated with the ultra-sound probe 6.

In use, an analyst will check the voltage displayed in voltmeter 11 and set the percent power scale 1b until the voltmeter 11 displays the validated voltage level determined during a method development and validation process. This adjustment could also be carried out automatically, using a feedback loop in a comparator. The power level calculation, signal transmission and power generation are effected using elements 2, 3, 4, and 5 in the same manner as that described in FIG. 1. The voltage is then transmitted to the ultra-sound probe 6 which sonicates the product particles 8 contained in suspension 7. The particles 8 are shown of regular sizes to represent improved sonication. The sonicated particles 8 are then channeled or taken to a laser diffraction equipment 9 for particle size measurements, which appear recorded as particle size distributions on histograms 10. Closely spaced histograms 10 represent the improved precision and reproducibility of the method and apparatus of the present document.

Figure 3:
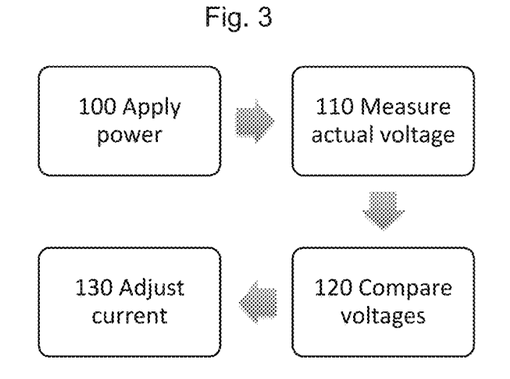
FIG. 3 is a flow diagram of the method of the current invention, in routine testing.

FIG. 3 shows a flow diagram of the method to maintain correct sonication power. In step 100, a power value is applied using the power controller command 1a to the ultra-sound probe 6 in the ultra-sound bath 12. The actual voltage produced by the ultra-sound probe 6 is measured in step 110 using the voltmeter 11 connected to the ultra-sound probe 6. The voltage of the ultra-sound probe 6 is compared with validated voltage in step 120. Should a difference be established then the voltage at the ultra-sound probe 6 is maintained at a desired level by reading the measured actual voltage and setting the current delivered to the ultra-sound probe 6 in step 130 using the electronic power controller 4 until the validated voltage is reached.

Figure 4:
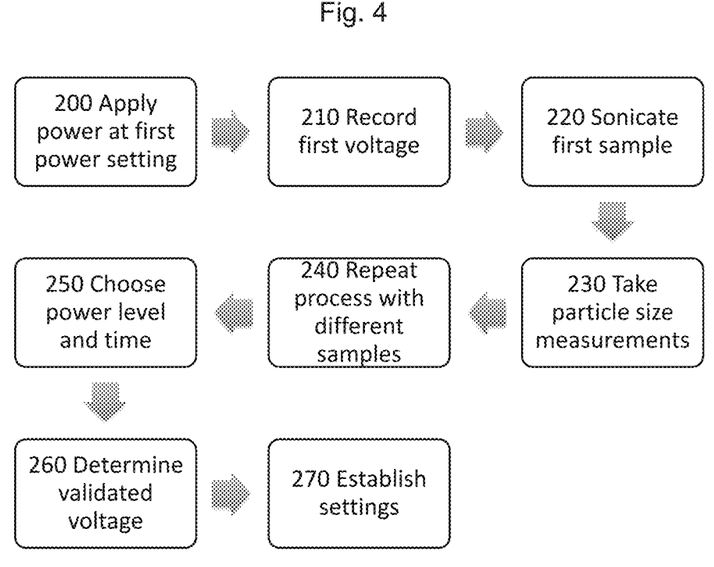
FIG. 4 is a flow diagram of the method of the current invention in method development and validation.

FIG. 4 shows a flow diagram of the manner in which an analyst can develop and validate an analytical method relating to the ultra-sound probe 6 to identify correct and reproducible operating parameters for de-agglomerating particles of a product of interest. The product of interest includes, but is not limited to a pharmaceutical product, such as a pulmonary pharmaceutical.

In a first step 200, a first power setting of the ultra-sound probe 6 for sonicating a first sample of the product of interest is chosen. A first voltage produced by the ultra-sound probe 6 at the first power setting is measured and recorded in step 210. The first sample is sonicated in step 220 at the first power setting whilst taking in step 230 particle size measurements at timed intervals to track the progress of the de-agglomeration of the first sample.

The process is repeated several times from step 240 using a further sample from the same batch at further power settings until a sufficient number of measurements have been made.

In step 250, a power level and time for the particle type for optimum de-agglomeration based is chosen based on results from the de-agglomeration of the samples. The validated voltage measured on the ultra-sound probe 6 corresponding to the selected power level is determined in step 260 these values are established in step 270 as the validated voltage and selected time as the settings for sonication of the particle of interest.

The invention will now be described further with reference to two examples, which also contain explanations about FIGS. 5, 6, 7, and 8.

Example 1

The method of the present invention was tested in five different laser diffraction machines, being Malvern Mastersizer 2000 and Mastersizer 3000 machines manufactured by Malvern Instruments Ltd (Malvern, United Kingdom). The Malvern Mastersizer 3000 was also used in Mastersizer 2000 mode, so six sets of data were obtained. Each of the machines had its own built-in ultra-sound bath, with ultra-sound probes of varying ages, and they were used to sonicate the samples prior to testing.

The same batch of a pulmonary inhalation drug product was used for the testing, and this batch was obtained using a validated manufacturing process of wet polishing yielding the highest particle size precision and reproducibility. When observed by optical microscopy, these particles had similar physical and size characteristics.

Table 1 below contains the results obtained using the method of the prior art, with the power level of the ultra-sound probe being set conventionally with a percent scale of maximum power. Table 2 contains the results obtained using the improved method of the present invention.

The drug product was tested in all machines following the conventional method where power is set at the same value in the percentage power scale 1b of the controller. (For the purpose of obtaining information about the voltage actually transmitted to the ultra-sound probe 6, a voltmeter was connected to the ultra-sound probe 6. However, the voltmeter was not used to adjust the percent power scale on the power controller command 1a.)

Samples of the same drug product batch were suspended in water with the addition of an appropriate dispersant in the built-in ultra-sound bath of each of the machines (four Malvern Mastersizer 2000 units, identified as CM06, CM09, CM0S and CM10 and one Malvern Mastersizer 3000 identified as CM10), sonicated and then size-tested by laser diffraction.

The test measured the size of the particles in the sample and then computed its distribution expressed as D10, D50 and D90. When the particles 8 are arranged on an ascending mass basis, these values are representative of the particle size, in microns, of the diameter of the largest particle found in 10%, 50% and 90% of the mass of particles and they are highly characteristic of the particle size distribution and thus of the quality of the product. The data are shown in Table 1.

TABLE 1

| Equipment | % Power | Probe Energy [V] | D10 (μm) | D50 (μm) | D90 (μm) |
|---|---|---|---|---|---|
| CM06 | 100 | 130 | 0.782 | 1.639 | 3.375 |
| CM09 | 100 | 150 | 0.761 | 1.628 | 3.324 |
| CM02 | 100 | 155 | 0.851 | 1.79 | 3.641 |
| CM05 | 100 | 152 | 0.814 | 1.703 | 3.308 |
| CM10 (2000 mode) | 100 | 151 | 1.439 | 3.026 | 5.783 |
| CM10 (3000 mode) | 100 | 151 | 1.079 | 2.631 | 4.953 |
| Mean | | | 0.9543 | 2.0695 | 4.0640 |
| Standard deviation | | | 0.2638 | 0.6038 | 1.0505 |
| Relative std. dev. | | | 27.64% | 29.18% | 25.85% |

The power was set at 100% of maximum power, as per the original method development data. The ultra-sound probe energy level was measured using a voltmeter and ranged from 130 to 155 V. Columns D10, D50 and D90 indicate the size data in each of the three size classes, given by each of the six series of tests in the five laser diffraction machines. Processing of the D10, D50 and D90 data yielded a mean, a standard deviation and a relative standard deviation (standard deviation/mean).

Significantly, the relative standard deviation ranged from 26% to 29%. These are values indicating high variability, although the particles 8 tested all came from the same batch, of known homogenous physical characteristics. These data therefore suggest that the laser diffraction test method was imprecise, had low reproducibility and therefore was not reliable.

The same batch of product was then retested in the same laser diffraction machines after the sonication power level was appropriately adjusted for each one of them as per the method of the present invention.

Table 2 shows the results obtained from following the method of the invention whereby the power is set by measuring the actual voltage produced by the probe and adjusting it using the percent power setting until it is at the value prescribed by the method development and validation process.

TABLE 2

| Equipment | % Power | Probe Energy [V] | D10 (μm) | D50 (μm) | D90 (μm) |
|---|---|---|---|---|---|
| CM06 | 100 | 130 | 0.782 | 1.639 | 3.375 |
| CM09 | 80 | 130 | 0.83 | 1.781 | 3.581 |
| CM02 | 75 | 130 | 0.758 | 1.693 | 3.847 |
| CM05 | 85 | 130 | 0.688 | 1.498 | 3.215 |
| CM10 (2000 mode) | 61 | 130 | 0.784 | 1.869 | 3.831 |
| CM10 (3000 mode) | 61 | 130 | 0.651 | 1.826 | 3.731 |
| Mean | | | 0.7488 | 1.7177 | 3.5967 |
| Standard deviation | | | 0.0668 | 0.1369 | 0.2572 |
| Relative std. dev. | | | 8.91% | 7.97% | 7.15% |

The data were obtained under the method of the invention and were again computed in the same manner as for Table 1.

The percent power scale was adjusted in each of the ultra-sound baths, so that the ultra-sound probe energy level measured by a voltmeter would read a constant 130 V. In order to set this validated voltage, the percent power scale 1b had to be set at values ranging from 61% to 100%. (It is interesting to note that the method was originally developed in machine CM06, at maximum power, suggesting CM06 was operated with a worn or corroded ultra-sound probe 6. This appears to be confirmed by the fact that the ultra-sound voltages used for the other machines in table 2 were set at a much lower percent power level to achieve the same voltage of 130 V).

In this second series of tests, the mean particle for each of the three size classes of D10, D50 and D90 were consistently smaller, (−21.5%, −17% and −11.5% smaller, respectively). More significantly, the relative standard deviation in the tests measurements in each of the D10, D50 and D90 size classes ranged from 7% to 9%, approximately a 3-fold improvement in reproducibility over the data of table 1 obtained with the known method.

The fact that the reproducibility in measurement data from five different machine is three times better when using the inventive method is an indication of its higher precision.

Figure 5:
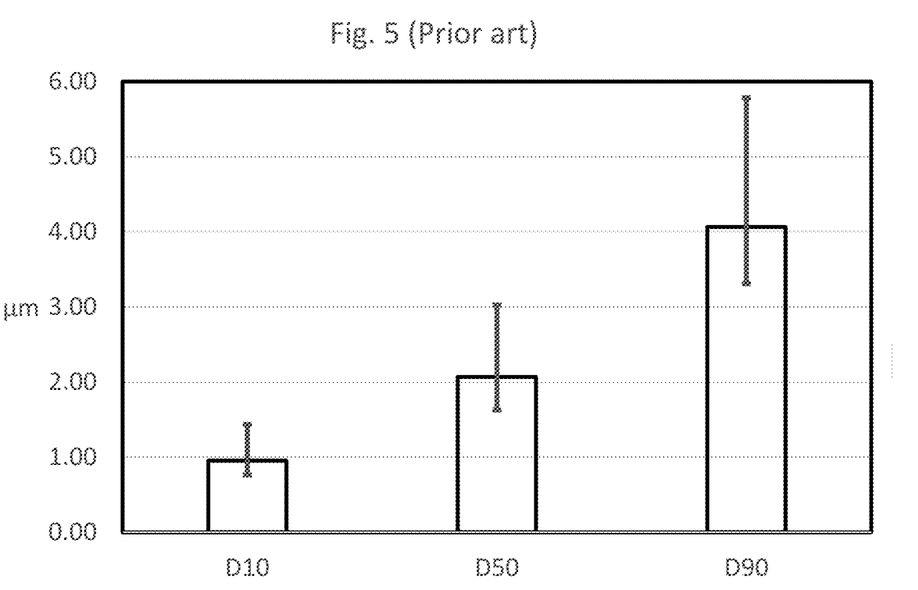
FIG. 5 shows the distribution of particle sizes for a first compound for 100% power in different equipment.
Figure 6:
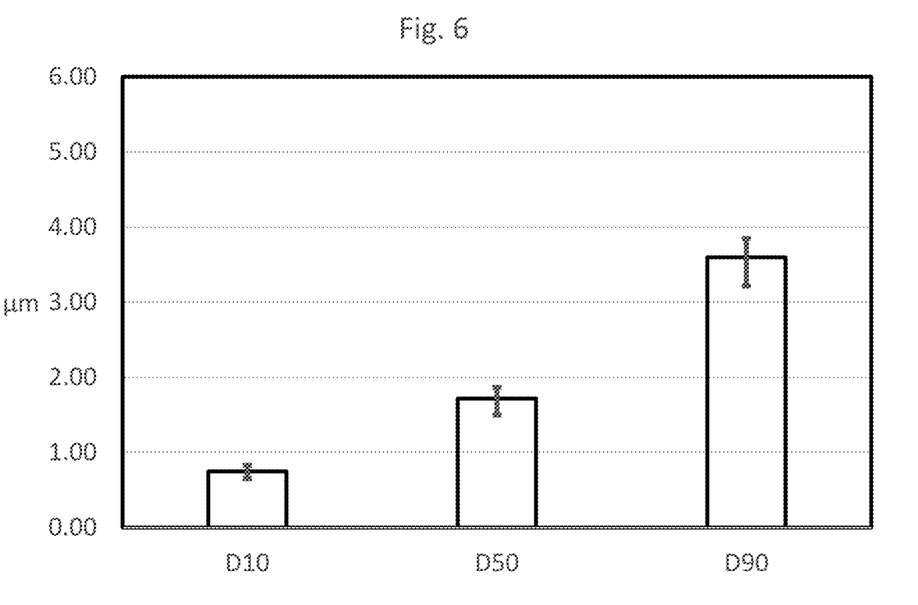
FIG. 6 shows the distribution of particles sizes of the first compound when the power is adjusted to maintain a constant ultra-sound probe energy.

The improvement can also be seen in FIGS. 5 and 6, where the data of Tables 1 and 2 have been plotted, respectively. The vertical bars represent particle size for each of the three size classes D10, D50 and D90 and the error bars represent the distance of the maximum data point to the mean and the distance of the minimum data point to the mean. FIG. 4 illustrating the present invention shows an evident improvement over FIG. 3, with a smaller amplitude of the error bars.

The data indicate a remarkable and long overdue improvement in particle size analysis by laser diffraction. They give proof to the benefits of the present invention by demonstrating the improved precision and reproducibility of particle size measurements of the same product across different ultra-sound baths and laser diffraction machines.

Example 2

The experiments of Example 1 were repeated to test a different compound, using four laser diffraction machines. The methods were the same—prior art and inventive methods.

The same batch of an undisclosed drug product was used for the testing, and this batch was obtained using a validated manufacturing process of a size reduction process yielding known particle size precision and reproducibility. When observed by optical microscopy, these particles had similar physical and size characteristics.

Table 3 below contains the results obtained using the method of the prior art, with the power level of the ultrasound probe being set conventionally with a percent scale of maximum power. Table 4 contains the results obtained using the improved method of the present invention.

The drug product was tested in all machines following the conventional method where power is set at the same value in the percentage power scale of the controller. Samples of the same drug product batch were suspended in an appropriate anti-solvent with the addition of an appropriate dispersant in the built-in ultra-sound bath of each of the machines (Malvern Mastersizer 2000 units, identified as CM06, CM09, CM02 and CMOS), sonicated and then size-tested by laser diffraction.

The data are shown in Table 3.

TABLE 3

| Equipment | % Power | Probe Energy [V] | D10 (μm) | D50 (μm) | D90 (μm) |
|---|---|---|---|---|---|
| CM06 | 20 | 39 | 12.271 | 46.846 | 92.688 |
| CM09 | 20 | 60 | 9.787 | 37.519 | 75.988 |
| CM02 | 20 | 41.6 | 12.667 | 44.53 | 90.043 |
| CM05 | 20 | 42.8 | 12.095 | 42.69 | 86.662 |
| Mean | | | 11.7050 | 42.8963 | 86.3453 |
| Standard deviation | | | 1.3008 | 3.9677 | 7.3320 |
| Relative std. dev. | | | 11.11% | 9.25% | 8.49% |

The power was set at 20% of maximum power, as per the original method development data. The energy level was measured using a voltmeter and ranged from 39 to 42.8 V. Columns D10, D50 and D90 indicate the size data in each of the three size classes, given by each of the series of tests in the four laser diffraction machines. Processing of the D10, D50 and D90 data yielded a mean, a standard deviation and a relative standard deviation (standard deviation/mean).

In this example, the relative standard deviation ranged from 8% to 11%. These are values indicating medium variability of the size determination method.

The same batch of product was then retested in the same laser diffraction machines after the sonication power level was appropriately adjusted for each one of them as per the method of the present invention.

Table 4 shows the results obtained from following the method of the invention whereby the power is set by measuring the actual voltage produced by the probe and adjusting it using the power setting until it is at the validated, prescribed value.

TABLE 4

| Equipment | % Power | Probe Energy [V] | D10 (μm) | D50 (μm) | D90 (μm) |
|---|---|---|---|---|---|
| CM06 | 22 | 43 | 10.927 | 41.448 | 85.625 |
| CM09 | 8 | 43 | 10.725 | 41.135 | 84.004 |
| CM02 | 21 | 43 | 12.377 | 43.738 | 87.992 |
| CM05 | 19 | 43 | 12.089 | 42.76 | 87.096 |
| Mean | | | 11.5295 | 42.2703 | 86.1793 |
| Standard deviation | | | 0.8249 | 1.2054 | 1.7479 |
| Relative std. dev. | | | 7.15% | 2.85% | 2.03% |

The data were obtained under the method of the invention and were again computed in the same manner as for Table 3.

The percent power scale was adjusted in each of the ultra-sound baths, so that the energy measured by a voltmeter would read the validated voltage value of 43 V. In order to set this voltage, the percent power scale had to be set at values ranging from 19% to 22%.

In this second series of tests, the mean particle for each of the three size classes of D10, D50 and D90 were of the same size as with the method of the prior art, but the relative standard deviation in the tests measurements in the D10 size class showed a slight improvement (from 11.11% to 7.15%), while in the D50 size class it showed a 3-fold improvement and in the D90 size class a 4-fold improvement over the data of table 3 obtained with the known method.

Figure 7:
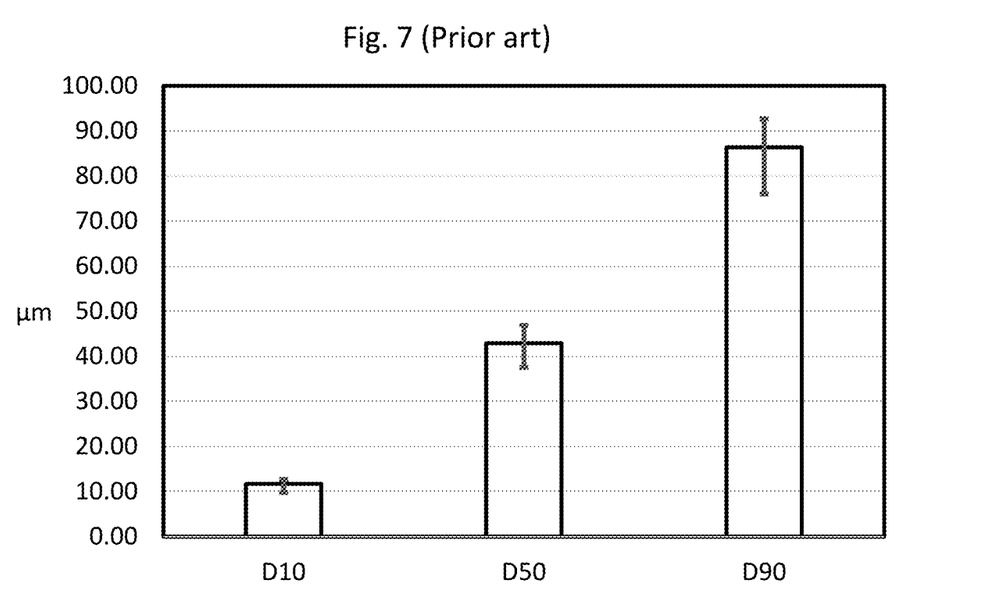
FIG. 7 shows the distribution of particle sizes for a second compound for 20% power in different equipment.
Figure 8:
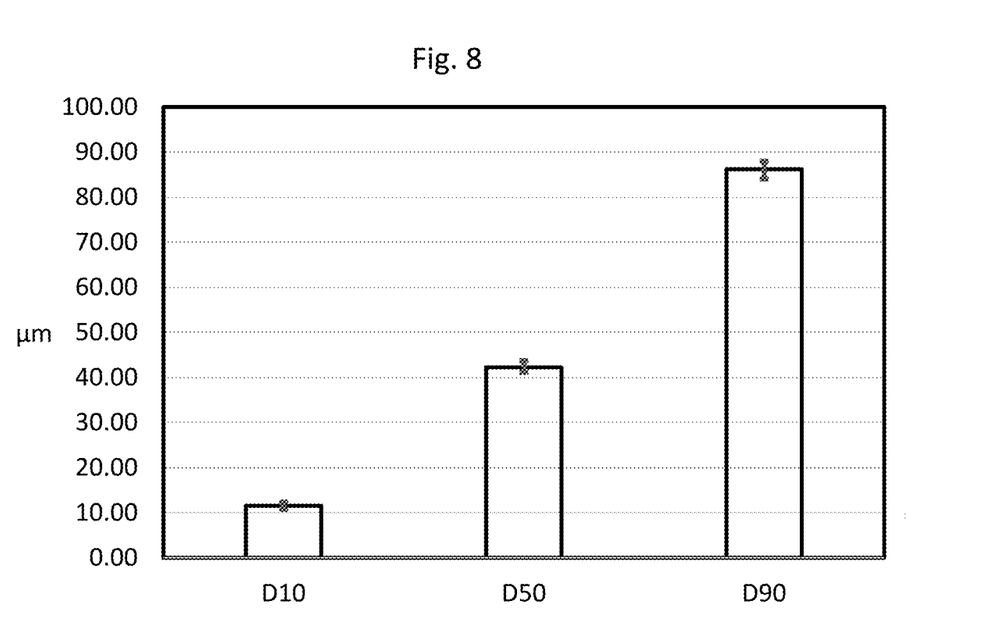
FIG. 8 shows the distribution of particles sizes of the second compound when the power is adjusted to maintain a constant ultra-sound probe energy.

The improvement can also be seen in FIGS. 7 and 8, where the data of Tables 3 and 4 have been plotted, respectively, in the same manner as the figures illustrating the data of the previous example. FIG. 6 illustrating the present invention shows an evident improvement over FIG. 5, with a smaller amplitude of the error bars.

The data for this example indicate that the same improvement in method precision and reproducibility as seen in Example 1 could be achieved with a different drug.

Example 3

The sonication performance of a new ultra-sound probe was compared with the sonication performance of an ultra-sound probe of undetermined age.

Two different batches of the same pharmaceutical drug product were tested. First, the samples were sonicated using an ultra-sound probe of undetermined age and tested by laser diffraction using a Malvern Mastersizer 2000 machine (CM02). Then, samples of the same two batches were sonicated using a new ultra-sound probe, in a different Malvern Mastersizer 2000 (CMOS) but no power adjustment was applied. Finally, the samples were tested again in CMOS, but this time the power of the new ultra-sound probe was adjusted so that the resulting voltage would match the voltage obtained in the first sonication and test of each of the batches. The particle size (PS) data is in tables 5 and 6.

TABLE 5

| Equipment | % Power | Probe Energy [V] | D10 (μm) | D50 (μm) | D90 (μm) |
|---|---|---|---|---|---|
| Mastersizer 2000 - CM02 with probe of undetermined old age | 20% | 44 V | 9.862 | 35.561 | 76.775 |
| Mastersizer 2000 - CM05 with new probe, no power adjustment | 20% | 54 V | 8.031 | 31.262 | 68.291 |
| % difference between old and new probe PS data | | | −18.57% | −12.09% | −11.05% |
| Mastersizer 2000 - CM05 with new probe, with power adjustment | 7% | 44 V | 8.837 | 32.873 | 71.429 |
| % difference between old and new probe PS data | | | −10.39% | −7.56% | −6.96% |

Compared to the first test carried out after sonication using an ultra-sound probe of undetermined age in CM02, particle size in the second test carried out after sonication using a new ultra-sound probe in CMOS was found to be smaller by 11% to 18.6% in each of the three size classes.

When the third test was carried out again in CM5 with a new ultra-sound probe but this time resorting to power adjustment, the particle size was found to be smaller but by a lower margin, 7% to 10.4% in each of the three size classes—closer to the original measurement in CM02.

Note that the new adjusted ultra-sound probe is producing 44V but only requires an input of 7% on the power scale to do so, as opposed to the CM02 sonicator which required 20% power to produce 44V. This confirms that the power output difference between the "old" probe and the new probe is real.

TABLE 6

| Equipment | % Power | Probe Energy [V] | D10 (μm) | D50 (μm) | D90 (μm) |
|---|---|---|---|---|---|
| Mastersizer 2000 - CM02 with probe of undetermined old age | 20% | 44 V | 6.675 | 24.841 | 59.38 |
| Mastersizer 2000 - CM05 with new probe, no power adjustment | 20% | 54 V | 6.178 | 22.589 | 52.878 |
| % difference between old and new probe PS data | | | −7.45% | −9.07% | −10.95% |
| Mastersizer 2000 - CM05 with new probe, with power adjustment | 7% | 44 V | 6.39 | 23.73 | 56.803 |
| % difference between old and new probe PS data | | | −4.27% | −4.47% | −4.34% |

Table 6 shows the test data of the second batch of the same product, following the same test protocol.

Compared to the first test carried out after sonication using an ultra-sound probe of undetermined age in CM02, particle size in the second test carried out after sonication using a new ultra-sound probe in CMOS was found to be smaller by 7.4% to 11% in each of the three size classes.

When the third test was carried out again in CM5 with a new ultra-sound probe but this time resorting to power adjustment, the particle size was found to be smaller but by a lower margin, around 4% in each of the three size classes—closer to the original measurement in CM02.

The data in tables 5 and 6 indicates that reproducibility error was reduced by adjusting percent power so as to ensure the use of a constant voltage.

REFERENCE NUMERALS

1a Power controller command
1b Power scale
2 Motherboard
3 Data channels
4 Electronic power controller
5 Power supply
6 Ultra-sound probe
7 Suspension
8 Particles
9 Laser diffraction equipment
10 Histograms
11 Voltmeter
12 Ultra-sound bath

BIBLIOGRAPHY

K. Mindgard, R. Morrell, P. Jackson, S. Patel and R. Buxton—Measurement Good Practices Guide No 111—Good Practice Guide for Improving the Consistency of Particle Size Measurement—ISSN 1368-6550

Amy Sabian—The Particle Experts, Problems in particle size: Laser Diffraction Observations—Autumn 2011, Vol 15/No. 04)

F. Storti and F. Balsamo—Particle size distributions by laser diffraction: sensitivity of granular matter strength to analytical operating procedures. Published in Solid Earth Discussions, 19 Apr. 2010).

Van der Graaf—Sonocrystallization, Nucleation of ammonium sulfate and alfa-lactose monohydrate due to ultrasonic irradiation—Master of Science thesis, Delft University of Technology, January 2011).

Lawrence C. Lynnworth—Industrial Application of Ultrasound—A Review. II. Measurements, Tests, and Process Control Using Low Intensity Ultra-sound—IEEE Transactions on Sonics and Ultrasonics, Vol SU-22, no. 2, March 1975

Patrick Dunne—Nonthermal Processing Technology for food—ISBN: 978-0-8138-1668-5, October 2010)

The invention claimed is:

1. A method to develop and validate an analytical method relating to an ultra-sound probe to identify correct and reproducible operating parameters for de-agglomerating particles of a product of interest, comprising the steps of:
   i. applying a first power setting of the ultra-sound probe for sonicating a first sample of the product of interest, measuring and recording a first voltage produced by the ultra-sound probe at the first power setting;
   ii. sonicating the first sample at the first power setting whilst taking particle size measurements at timed intervals to track the progress of the de-agglomeration of the first sample;
   iii. selecting a second power setting of the ultra-sound probe which is different from the first power setting, measuring and recording a second voltage produced by the ultra-sound probe at the second power setting, sonicating a second sample of the product of interest at the second power setting whilst taking particle size measurements at timed intervals to track the progress of the de-agglomeration of the second sample;
   iv. choosing a power level and time for the particle type for optimum de-agglomeration based on results from the de-agglomeration of the first sample and the second sample;
   v. determining a validated voltage measured on the ultra-sound probe corresponding to the selected power level; and
   vi. establishing the validated voltage and selected time as the settings for sonication of the particle of interest.

2. The method according to claim 1, comprising repeating the selection of the power settings for further samples of the product of interest and taking further particle size measurement at timed intervals to track the progress of the de-agglomeration of the further, and selecting the power level and the time for the particle type for optimum de-agglomeration being selected based on the particle size measurement data collected for the power settings.

3. The method of claim 1, wherein the product of interest is a pharmaceutical powder.

4. A method for producing ultra-sound energy to disperse particle agglomerates suspended in a liquid medium using the settings for validated voltage and selected time established using the method of claim 1.

5. The use method of claim 4 further comprising a preparation of a suspension of a sample of a powder of interest in the liquid medium.

6. The method of claim 5, further comprising measurement of the particle size of the suspension by laser diffraction.

7. The method of claim 4, wherein the further comprising adjusting and setting of the settings to compensates for wear and corrosion of the probe.

* * * * *